(12) United States Patent
Kusano

(10) Patent No.: US 12,373,049 B2
(45) Date of Patent: Jul. 29, 2025

(54) INFORMATION PROCESSING APPARATUS, NON-TRANSITORY COMPUTER READABLE MEDIUM STORING PROGRAM, AND INFORMATION PROCESSING METHOD

(71) Applicant: FUJIFILM Business Innovation Corp., Tokyo (JP)

(72) Inventor: Nobumi Kusano, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 332 days.

(21) Appl. No.: 17/953,314

(22) Filed: Sep. 26, 2022

(65) Prior Publication Data

US 2023/0297179 A1 Sep. 21, 2023

(30) Foreign Application Priority Data

Mar. 17, 2022 (JP) ................................ 2022-042600

(51) Int. Cl.
*G06F 3/041* (2006.01)
*G06F 3/04886* (2022.01)
*G06F 3/04817* (2022.01)

(52) U.S. Cl.
CPC .......... *G06F 3/041* (2013.01); *G06F 3/04886* (2013.01); *G06F 3/04817* (2013.01);
(Continued)

(58) Field of Classification Search
CPC .. G06F 3/041; G06F 3/04886; G06F 3/04817; G06F 2203/04101;
(Continued)

(56) References Cited

U.S. PATENT DOCUMENTS

2012/0092251 A1* 4/2012 Hashimoto ............ B60K 35/81
345/156
2013/0009891 A1 1/2013 Watanabe et al.
(Continued)

FOREIGN PATENT DOCUMENTS

JP 2013016018 1/2013
JP 2014074955 4/2014
JP 2014115733 6/2014

*Primary Examiner* — Rodney Amadiz
(74) *Attorney, Agent, or Firm* — JCIPRNET

(57) ABSTRACT

An information processing apparatus includes a processor configured to, in displaying an operator on a display screen laminated with an operation surface in an image display device on which a contact operation of operating the operator displayed on the display screen in a state where an instruction object is in contact with the operation surface, and a contactless operation of operating the operator displayed on the display screen in a state where the instruction object is within a preset height range from the operation surface can be performed, acquire information about a height from the operation surface to the instruction object, in a case where the instruction object is not in contact with the operation surface and a distance in which the instruction object is separated from the height range in a height direction is within a preset distance, display an operator for the contactless operation and an operator for the contact operation in a superimposed manner on the display screen, and in a case where the instruction object is in contact with the operation surface, display only the operator for the contact operation on the display screen.

20 Claims, 14 Drawing Sheets

(52) U.S. Cl.
CPC .............. *G06F 2203/04101* (2013.01); *G06F 2203/04804* (2013.01)

(58) Field of Classification Search
CPC ........... G06F 2203/04804; G06F 3/044; G06F 3/03547; G06F 3/0482; G06F 3/04845; G06F 3/0488; G01C 21/3664
See application file for complete search history.

(56) References Cited

U.S. PATENT DOCUMENTS

| | | | |
|---|---|---|---|
| 2015/0205943 A1* | 7/2015 | Takenaka | G06F 3/04847 726/17 |
| 2015/0242102 A1 | 8/2015 | Enami et al. | |
| 2016/0224235 A1* | 8/2016 | Forsström | G06F 3/04845 |
| 2017/0024424 A1* | 1/2017 | Almohizea | G06F 16/2246 |
| 2024/0256087 A1* | 8/2024 | Seo | G01S 7/4811 |

* cited by examiner

INFORMATION PROCESSING APPARATUS, NON-TRANSITORY COMPUTER READABLE MEDIUM STORING PROGRAM, AND INFORMATION PROCESSING METHOD

CROSS-REFERENCE TO RELATED APPLICATIONS

This application is based on and claims priority under 35 USC 119 from Japanese Patent Application No. 2022-042600 filed Mar. 17, 2022.

BACKGROUND

(i) Technical Field

The present disclosure relates to an information processing apparatus, a non-transitory computer readable medium storing a program, and an information processing method.

(ii) Related Art

JP2014-115733A discloses an information processing apparatus that provides an intuitive sense of operation about which position each finger or pen approaches before the finger or the pen comes into contact with an operation device in a case where the operation device and a display device are separated.

JP2014-074955A discloses an operation device that facilitates input in an operation space separated from an operation surface.

JP2013-016018A discloses a display control device that enables display means for displaying a plurality of objects in a superimposed manner to be comfortably operated.

SUMMARY

An image display device in which a display screen is laminated with an operation surface and a contact operation of operating an operator displayed on the display screen in a state where an instruction object is in contact with the operation surface can be performed has been used in various electronic apparatuses.

In addition, an image display device in which a contactless operation of operating an operator displayed on a display screen in a state where an instruction object is not in contact with an operation surface and the instruction object is within a preset height range from the operation surface can be performed has also been suggested.

However, none of the image display devices uses the contact operation and the contactless operation together.

Aspects of non-limiting embodiments of the present disclosure relate to an information processing apparatus, a non-transitory computer readable medium storing a program, and an information processing method that enable a contact operation and a contactless operation to be used together on an image display device.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to, in displaying an operator on a display screen laminated with an operation surface in an image display device on which a contact operation of operating the operator displayed on the display screen in a state where an instruction object is in contact with the operation surface, and a contactless operation of operating the operator displayed on the display screen in a state where the instruction object is within a preset height range from the operation surface can be performed, acquire information about a height from the operation surface to the instruction object, in a case where the instruction object is not in contact with the operation surface and a distance in which the instruction object is separated from the height range in a height direction is within a preset distance, display an operator for the contactless operation and an operator for the contact operation in a superimposed manner on the display screen, and in a case where the instruction object is in contact with the operation surface, display only the operator for the contact operation on the display screen.

BRIEF DESCRIPTION OF THE DRAWINGS

Exemplary embodiment(s) of the present invention will be described in detail based on the following figures, wherein.

DETAILED DESCRIPTION

Figure 1:
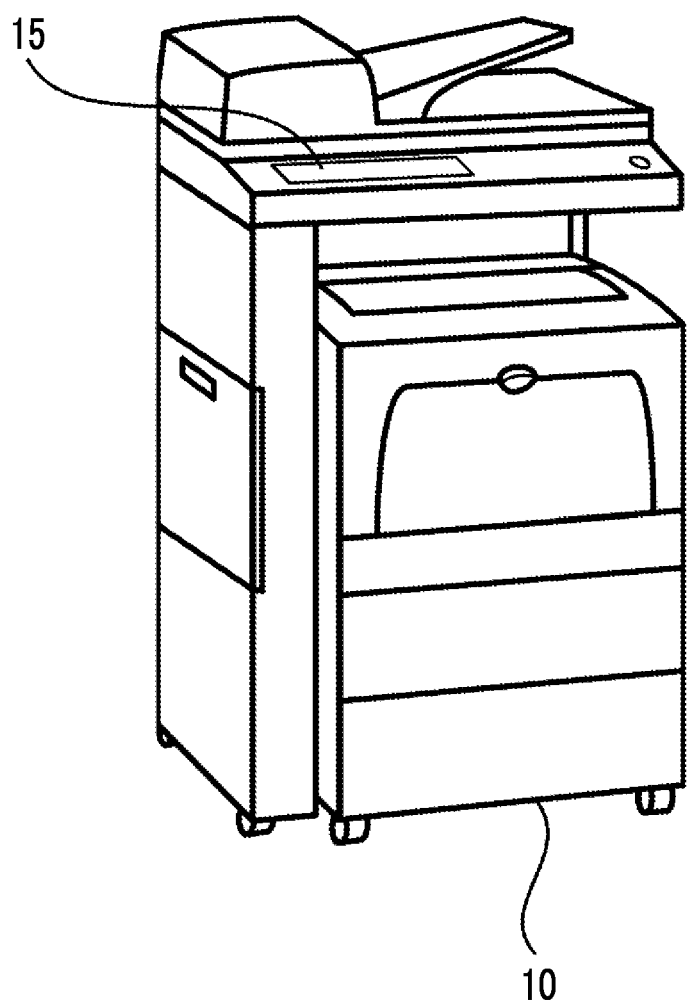
FIG. 1 is an exterior diagram of an image forming apparatus of an exemplary embodiment of the present disclosure.

Hereinafter, an exemplary embodiment of the present disclosure will be described in detail with reference to the drawings. FIG. 1 is an exterior diagram of an image forming apparatus of the exemplary embodiment.

An image forming apparatus 10 is an apparatus referred to as a so-called multifunction peripheral having a plurality of functions such as a scanning function, a copying function, and a facsimile function. In addition, the image forming apparatus 10 also has a printing function of receiving printing data transmitted from an external apparatus and outputting an image corresponding to the printing data on a paper sheet. In addition, the image forming apparatus 10 includes a touch panel 15. The image forming apparatus 10 is an example of an information processing apparatus according to the exemplary embodiment of the present disclosure. In addition, the touch panel 15 is an example of an image display device according to the exemplary embodiment of the present disclosure.

Figure 2:
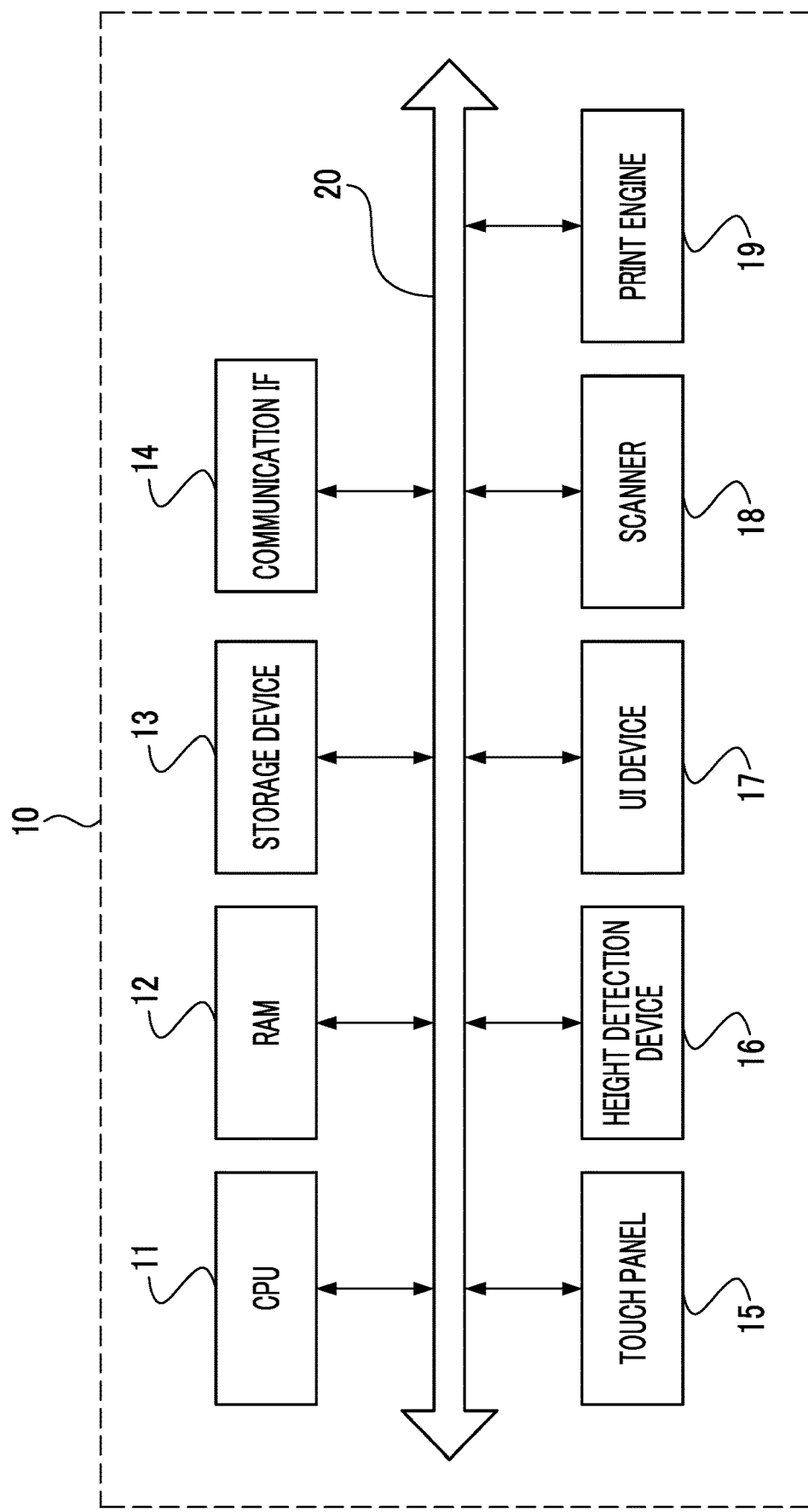
FIG. 2 is a block diagram illustrating a hardware configuration of the image forming apparatus of the exemplary embodiment of the present disclosure.

FIG. 2 is a block diagram illustrating a hardware configuration of the image forming apparatus 10 of the exemplary embodiment of the present disclosure. As illustrated in FIG. 2, the image forming apparatus 10 includes a central processing unit (CPU) 11, a random access memory (RAM) 12, a storage device 13 such as a hard disk drive, a communication interface (abbreviated to IF) 14, the touch panel 15, a height detection device 16, a user interface (abbreviated to UI) device 17 such as various buttons, a scanner 18, and a print engine 19. These constituents are connected to each other via a control bus 20.

The touch panel 15 has both of a function as a display unit for displaying information related to the apparatus, an icon for operation, and the like and a function as an input unit that receives an instruction input for an icon.

Figure 3:
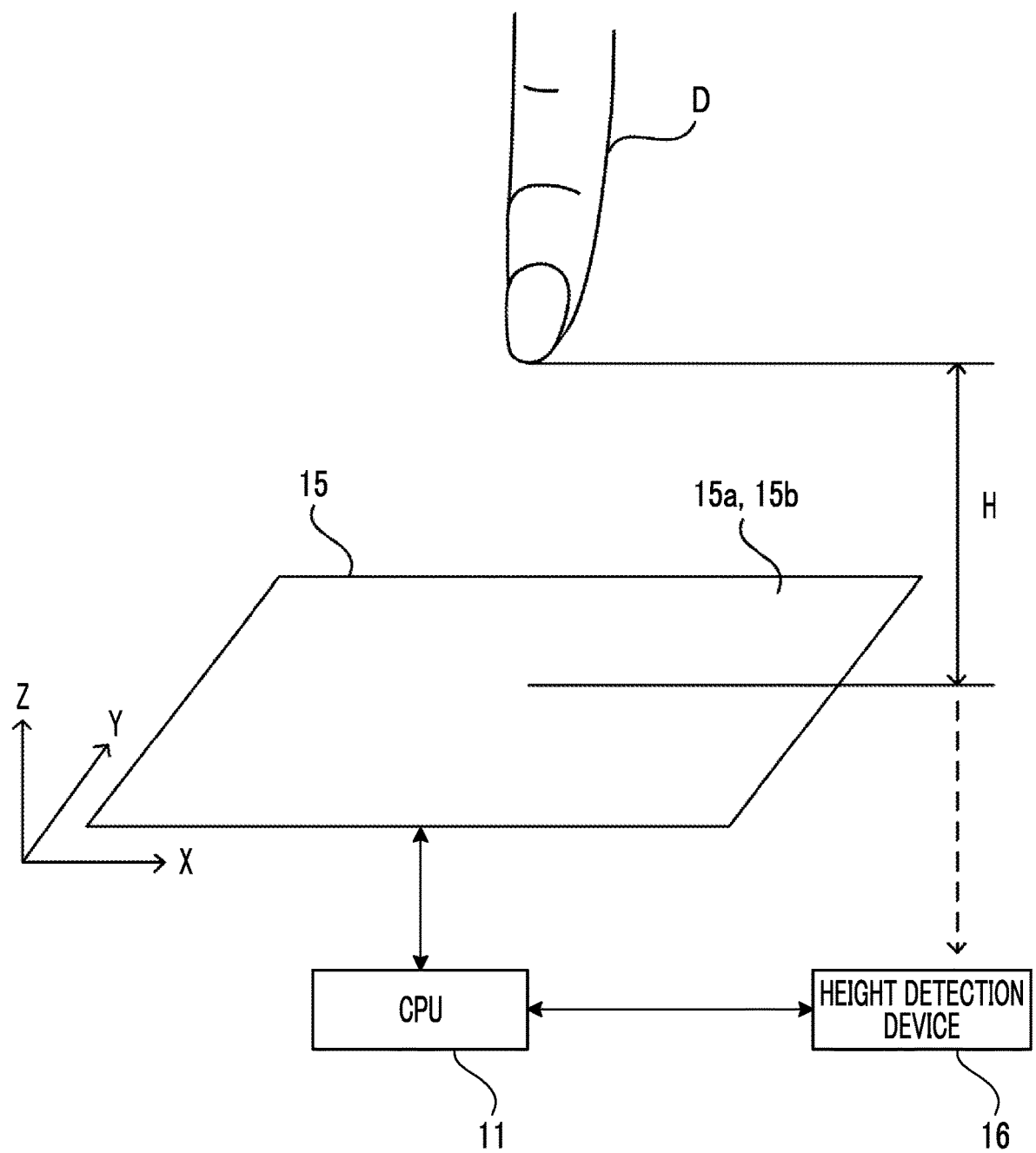
FIG. 3 is a diagram illustrating a configuration of a touch panel and a height detection device of the image forming apparatus of the exemplary embodiment of the present disclosure.

FIG. 3 is a diagram illustrating a configuration of the touch panel 15 and the height detection device 16 of the image forming apparatus 10 of the present exemplary embodiment. As illustrated in FIG. 3, the touch panel 15 has a structure in which a display screen 15a is laminated with an operation surface 15b. A contact operation of operating an icon displayed on the display screen 15a in a state where an instruction object D is in contact with the operation surface 15b can be performed on the touch panel 15. In addition, a contactless operation of operating an icon displayed on the display screen 15a in a state where the instruction object D is not in contact with the operation surface 15b and the instruction object D is within a preset height range from the operation surface can also be performed on the touch panel 15.

For the contact operation, as an example, an input operation can be performed by coming into contact with an icon for the contact operation displayed on the display screen 15a of the touch panel 15. In addition, for the contactless operation, as an example, an input operation can be performed by maintaining the instruction object D for a preset time or longer within a preset height range HR above an icon for the contactless operation displayed on the display screen 15a of the touch panel 15.

For example, the instruction object D for operating the touch panel 15 may be any object such as a hand or a finger of an operating person or a stylus pen with which the touch panel 15 can be operated.

The height detection device 16 is a device that detects a height H from the operation surface 15b to the instruction object D. The height detection device 16 may be configured to be integrated with the touch panel 15 or may be configured to be separated from the touch panel 15. In addition, a type of the height detection device 16 may be any type. For example, an electrostatic capacitance type, a type of analyzing a position, a motion, and the like of the instruction object D from an image captured by a camera, or a type of causing measurement light such as an infrared ray or laser light to hit the instruction object D and measuring the position and the motion from reflective light can be used.

A height direction is a direction intersecting with the operation surface 15b. In the present exemplary embodiment, as an example, a Z axis direction perpendicular to the operation surface 15b in a case where the operation surface 15b is set to be in an X-Y plane is set as the height direction.

The communication IF 14 transmits and receives data to and from the external apparatus or the like via a network. The UI device 17 receives an instruction input from a user from other than the touch panel 15. The scanner 18 scans an original document loaded in the image forming apparatus 10 as image data. The print engine 19 prints an image on a recording medium such as a printing paper sheet through steps of electrostatic charging, exposure, development, transfer, fixing, and the like.

The CPU 11 is a processor that controls an operation of the image forming apparatus 10 by executing a predetermined process based on a control program stored in the RAM 12 or the storage device 13. In the present exemplary embodiment, while the CPU 11 reads and executes the control program stored in the RAM 12 or the storage device 13, the present disclosure is not limited thereto. The control program may be provided in the form of a recording on a computer readable recording medium. For example, the program may be provided in the form of a recording on an optical disc such as a compact disc (CD)-read only memory (ROM) and a digital versatile disc (DVD)-ROM or in the form of a recording on a semiconductor memory such as a universal serial bus (USB) memory and a memory card. In addition, the control program may be acquired from the external apparatus via a communication line connected to the communication IF 14.

Figure 4:
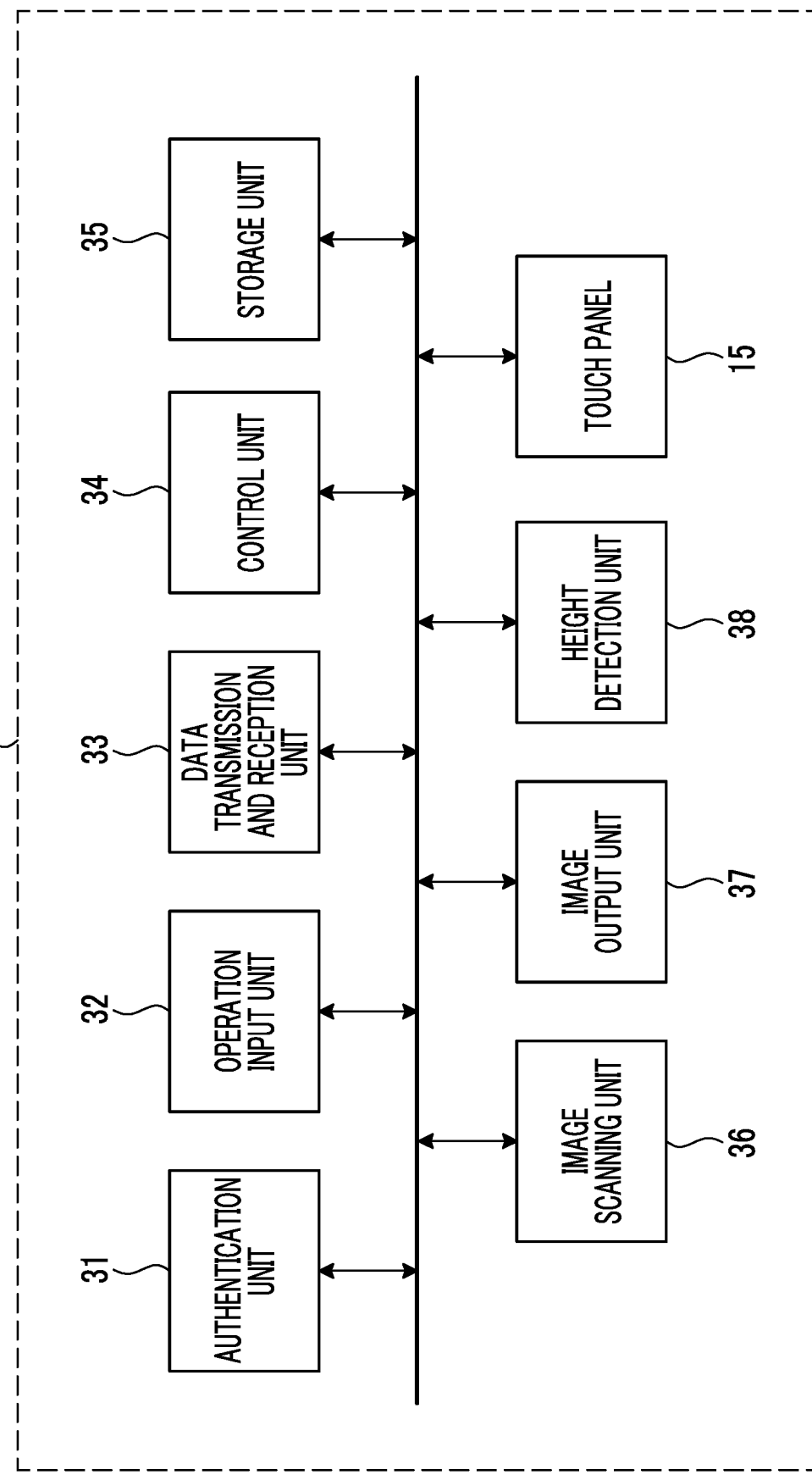
FIG. 4 is a block diagram illustrating a functional configuration of the image forming apparatus of the exemplary embodiment of the present disclosure.

FIG. 4 is a block diagram illustrating a functional configuration of the image forming apparatus 10 implemented by executing the control program.

As illustrated in FIG. 4, the image forming apparatus 10 of the present exemplary embodiment includes an authentication unit 31, an operation input unit 32, a data transmission and reception unit 33, a control unit 34, a storage unit 35, an image scanning unit 36, an image output unit 37, a height detection unit 38, and the touch panel 15.

The authentication unit 31 executes an authentication process for a user who wants to use the image forming apparatus 10. The operation input unit 32 inputs information about various operations performed by the user. The data transmission and reception unit 33 transmits and receives data to and from the external apparatus.

The control unit 34 controls an overall operation of the image forming apparatus 10 and performs a control of scanning an original document image by the image scanning unit 36, a control of outputting the printing data from the image output unit 37, and the like based on the instruction input from the user. The storage unit 35 stores various information necessary for operating the image forming apparatus 10 in addition to the control program.

The image scanning unit 36 scans the original document image from the loaded original document under control of the control unit 34. The image output unit 37 outputs the image onto the recording medium such as a printing paper sheet under control of the control unit 34. The height detection unit 38 detects the height H from the operation surface 15*b* to the instruction object D.

As described above, operations of both of the contact operation and the contactless operation can be performed on the touch panel 15 of the image forming apparatus 10 of the present exemplary embodiment. For the contact operation, as an example, an input operation can be performed by coming into contact with the icon for the contact operation displayed on the display screen 15*a* of the touch panel 15. In addition, for the contactless operation, as an example, an input operation can be performed by maintaining the instruction object D for the preset time or longer within the preset height range HR above the icon for the contactless operation displayed on the display screen 15*a* of the touch panel 15.

Figure 5:
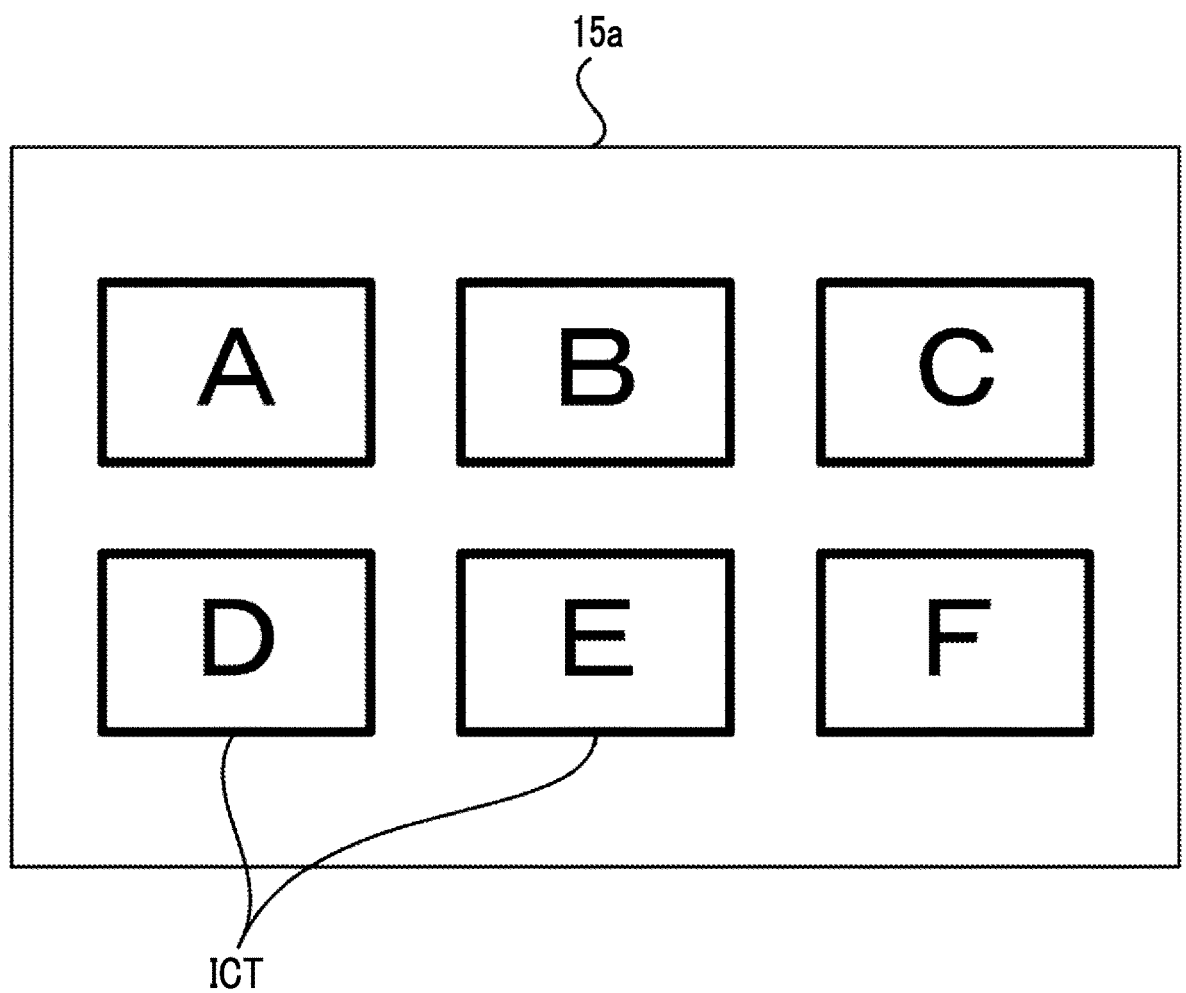
FIG. 5 is a diagram illustrating a display example of an icon for a contact operation on a display screen of the touch panel.

FIG. 5 is a diagram illustrating a display example of an icon ICT for the contact operation. In the contact operation, as illustrated in FIG. 5, the icon ICT for the contact operation is displayed on the display screen 15*a* of the touch panel 15. In the present exemplary embodiment, as an example, six icons ICT for the contact operation including a button A to a button F are displayed. The icon ICT for the contact operation is an example of an operator for a contact operation according to the exemplary embodiment of the present disclosure.

Figure 6:
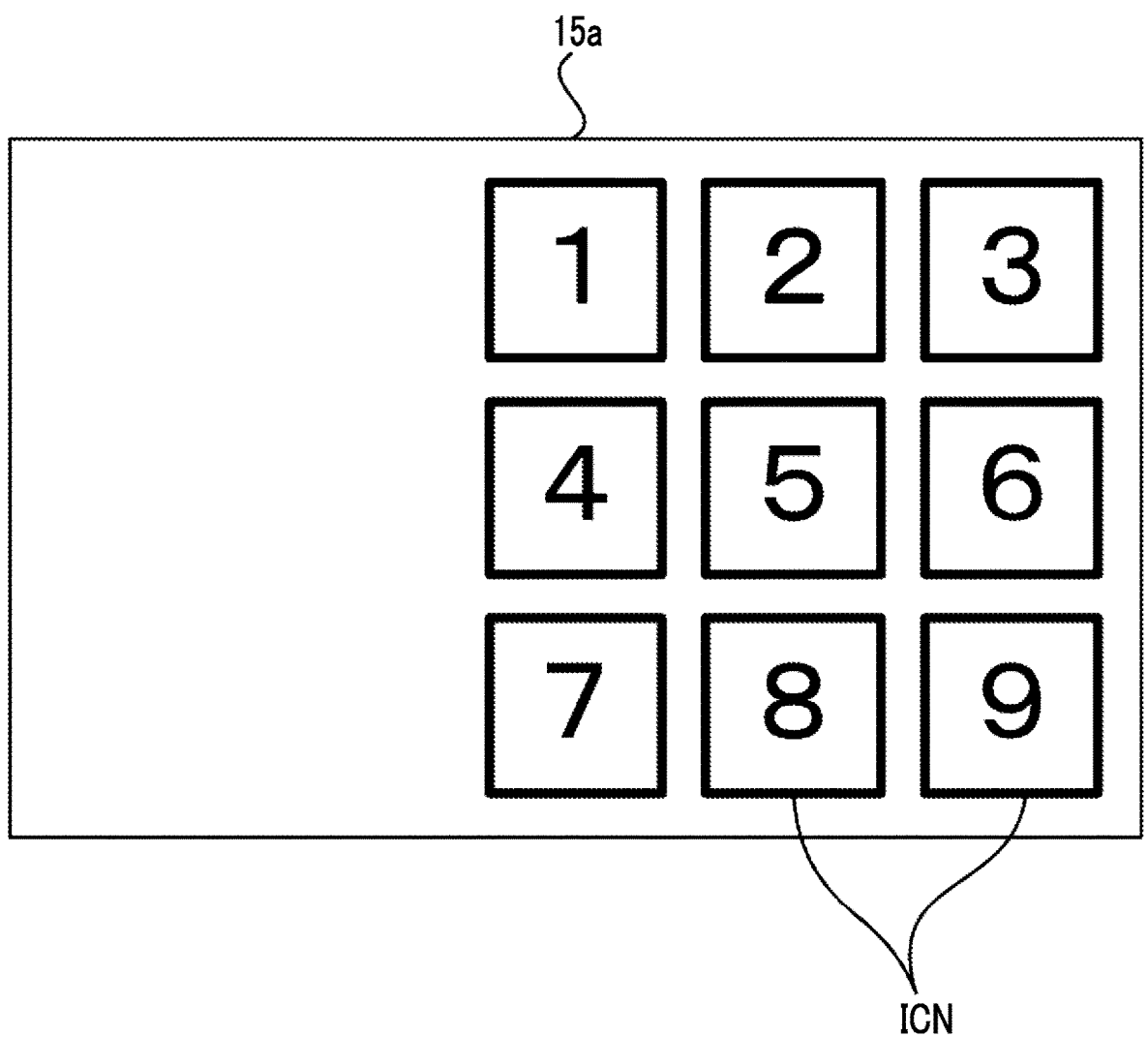
FIG. 6 is a diagram illustrating a display example of an icon for a contactless operation on the display screen of the touch panel.

FIG. 6 is a diagram illustrating a display example of an icon ICN for the contactless operation. In the contactless operation, as illustrated in FIG. 6, the icon ICN for the contactless operation is displayed on the display screen 15*a* of the touch panel 15. In the present exemplary embodiment, as an example, the icons ICN for the contactless operation including nine numeric keys of 0 to 9 are displayed. The icon ICN for the contactless operation is an example of an operator for a contactless operation according to the exemplary embodiment of the present disclosure.

Figure 7:
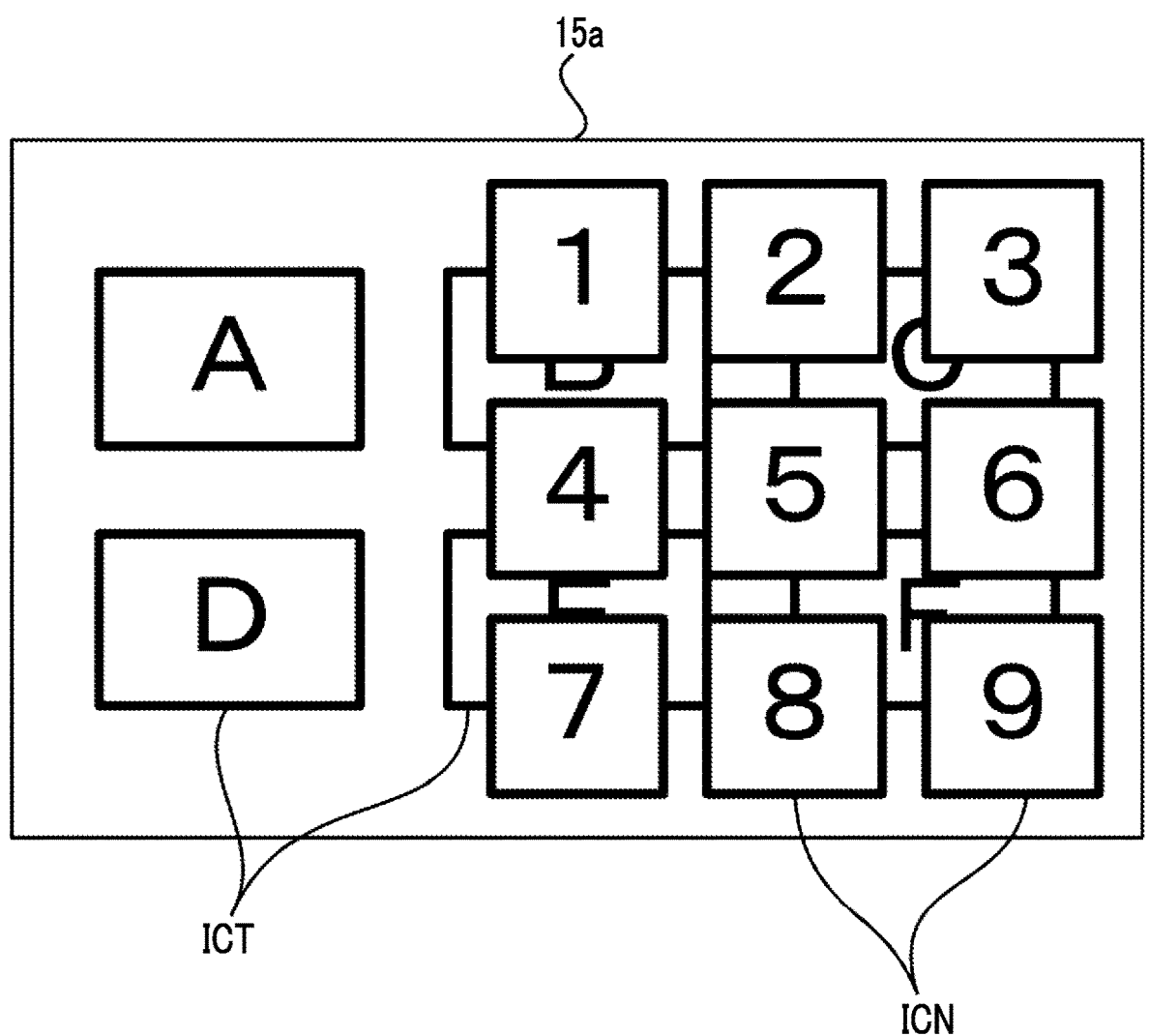
FIG. 7 is a diagram illustrating a display example of a case where the icon for the contact operation and the icon for the contactless operation are displayed in a superimposed manner on the display screen of the touch panel.

FIG. 7 is a diagram illustrating a display example of a case where the icon ICT for the contact operation and the icon ICN for the contactless operation are displayed in a superimposed manner. In addition, FIG. 8 is a diagram for describing a process in displaying the icon for operation on the display screen 15*a* of the touch panel 15.

In displaying the icon for operation on the display screen 15*a* of the touch panel 15, the control unit 34 acquires information about the height from the operation surface 15*b* to the instruction object D. In a case where the instruction object D is not in contact with the operation surface 15*b* and a distance in which the instruction object D is separated from the height range HR in the height direction Z is less than or equal to a preset distance, the control unit 34 displays the icon ICN for the contactless operation and the icon ICT for the contact operation in a superimposed manner on the display screen 15*a* as illustrated in FIG. 7. In a case where the instruction object D is in contact with the operation surface 15*b*, the control unit 34 displays only the icon ICT for the contact operation on the display screen 15*a* as illustrated in FIG. 5.

For example, an assumption is made that a height range of greater than or equal to 2 cm and less than or equal to 4 cm is set as the preset height range HR in which the contactless operation can be performed, and 1 cm is set as a threshold value of an allowable range in which display of the icon ICN for the contactless operation is allowed in a case where the instruction object D is separated from the height range HR.

Figure 8:
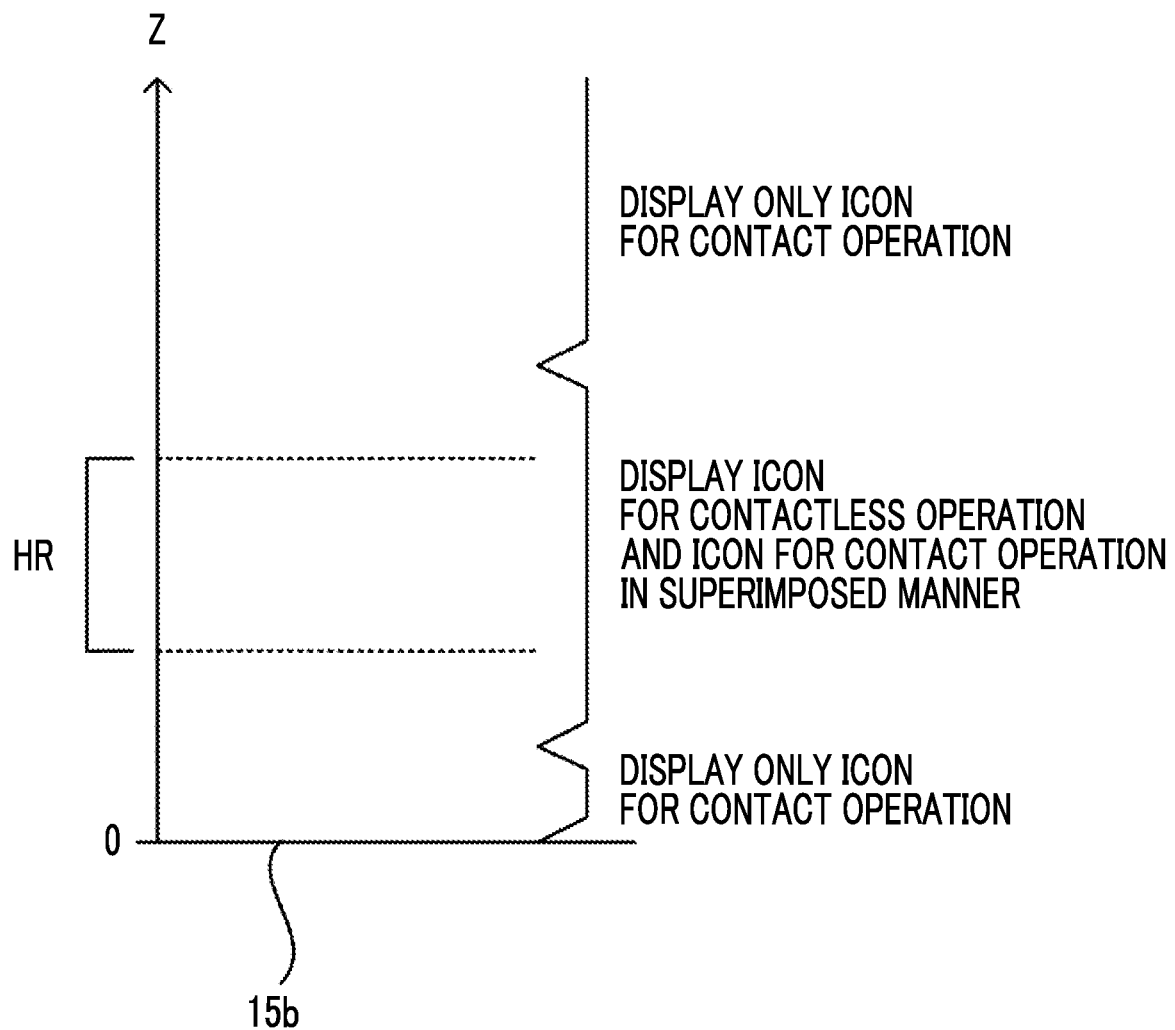
FIG. 8 is a diagram for describing a process in displaying an icon for operation on the display screen of the touch panel.

In this case, as illustrated in FIG. 8, in a case where the height from the operation surface 15*b* to the instruction object D is within a range of greater than or equal to 1 cm and less than or equal to 5 cm, the control unit 34 displays the icon ICN for the contactless operation and the icon ICT for the contact operation in a superimposed manner on the display screen 15*a*.

In addition, in a case where the instruction object D is in contact with the operation surface 15*b*, and in a case where the instruction object D is not in contact with the operation surface 15*b* and is separated to the operation surface 15*b* side from the height range HR by more than the allowable range, that is, in a case where the height from the operation surface 15*b* to the instruction object D is within a range of greater than or equal to 0 cm and less than 1 cm, the control unit 34 displays only the icon ICT for the contact operation on the display screen 15*a*.

As illustrated in FIG. 8, in a case where the instruction object D is separated by the preset distance or more from a position of the height range HR farthest from the operation surface 15*b* in the height direction Z based on the operation surface 15*b*, the control unit 34 may display only the icon ICT for the contact operation on the display screen 15*a*.

Figure 9:
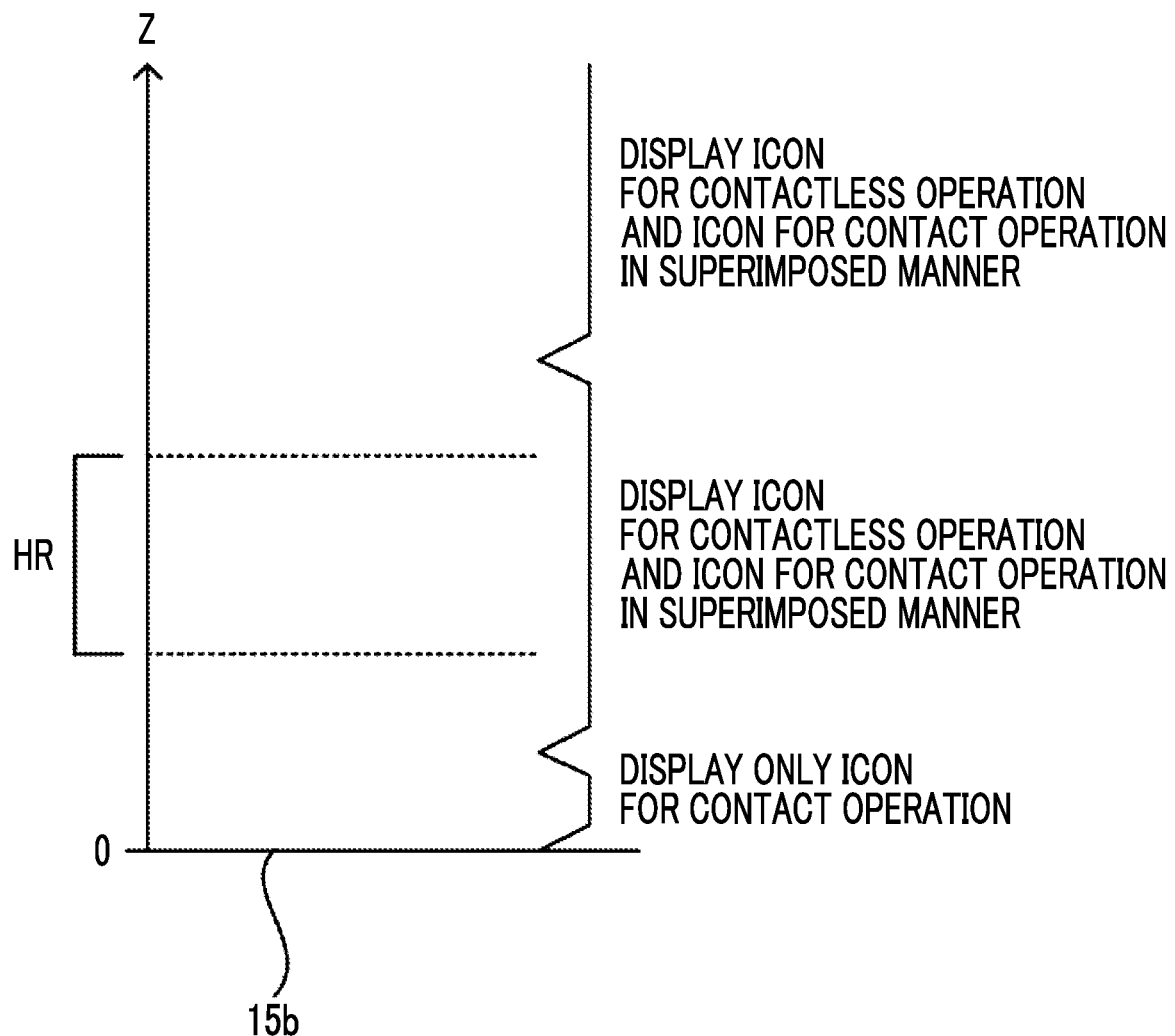
FIG. 9 is a diagram for describing another process in displaying the icon for operation on the display screen of the touch panel.

In addition, as illustrated in FIG. 9, in a case where the instruction object D is separated by the preset distance or more from the position of the height range HR farthest from the operation surface 15*b* in the height direction Z based on the operation surface 15*b*, the control unit 34 may display the icon ICN for the contactless operation and the icon ICT for the contact operation in a superimposed manner on the display screen 15*a*.

In addition, in displaying the icon ICN for the contactless operation and the icon ICT for the contact operation in a superimposed manner on the display screen 15*a*, the control unit 34 may superimpose the icon ICN for the contactless operation on the icon ICT for the contact operation as illustrated in FIG. 7. In addition, in displaying the icon ICN for the contactless operation and the icon ICT for the contact operation in a superimposed manner on the display screen 15*a*, the control unit 34 may superimpose the icon ICT for the contact operation on the icon ICN for the contactless operation.

Figure 10:
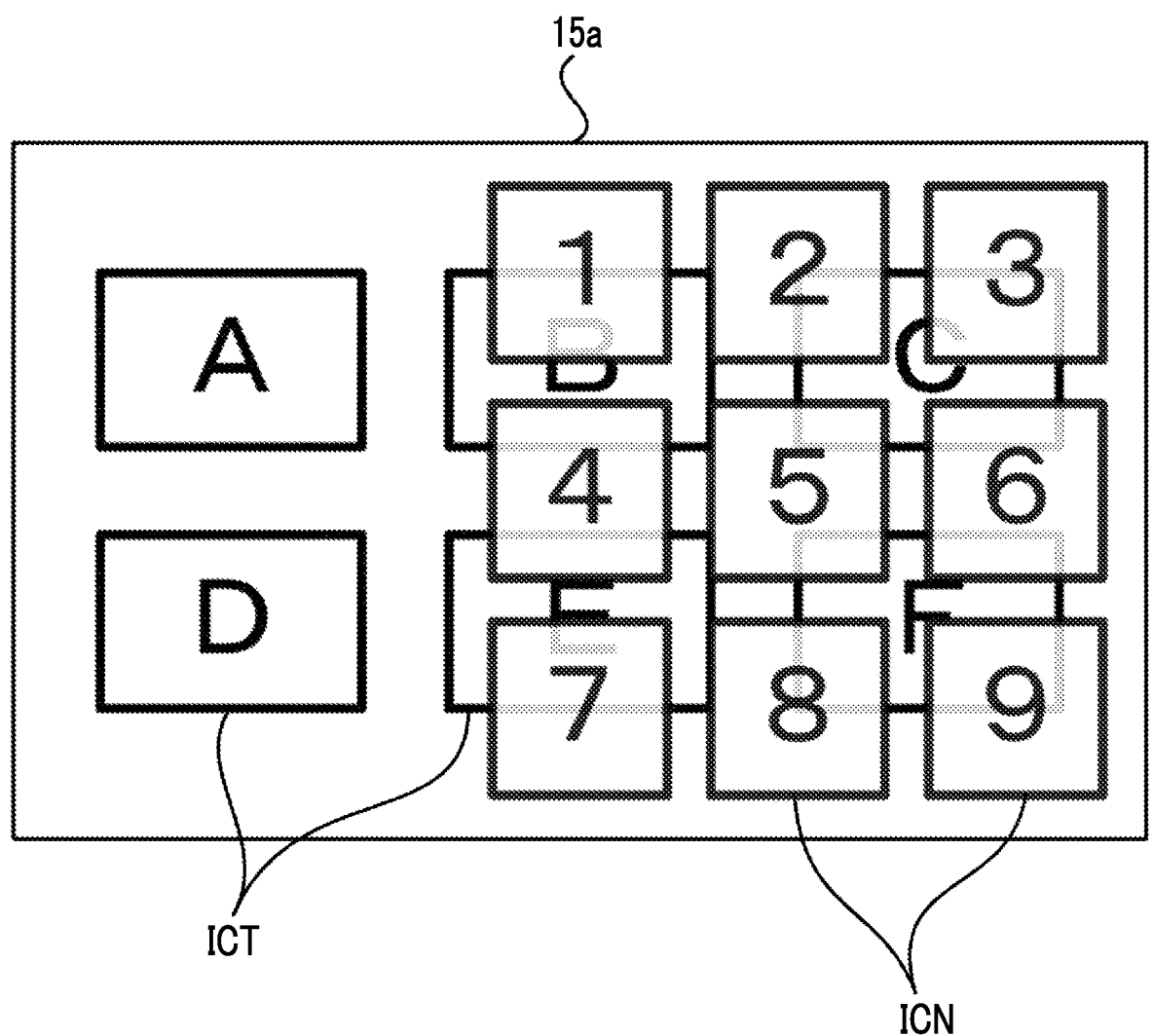
FIG. 10 is a diagram illustrating a display example of a state where the icon for the contactless operation is set to be semi-transparent in displaying the icon for the contact operation and the icon for the contactless operation in a superimposed manner.

In addition, as illustrated in FIG. 10, in displaying the icon ICN for the contactless operation in a superimposed manner on the icon ICT for the contact operation on the display screen 15*a*, the control unit 34 may display the icon ICN for the contactless operation in a semi-transparent state.

Here, "semi-transparent" means a state where a degree of transparency is not 50% and is between transparency (that is, a degree of transparency of 100%) and opacity (that is, a degree of transparency of 0%).

In addition, in displaying the icon ICN for the contactless operation and the icon ICT for the contact operation in a superimposed manner on the display screen 15*a*, the control unit 34 may perform a process of decreasing visibility of the icon ICN for the contactless operation corresponding to the height range HR as the instruction object D is separated from the height range HR.

Here, the process of decreasing the visibility may be a process of improving the degree of transparency, a process of decreasing sharpness, or both of the processes. For the process of decreasing the sharpness, for example, any image processing that decreases the sharpness such as a mosaic process using a Gaussian filter may be performed.

Figure 11:
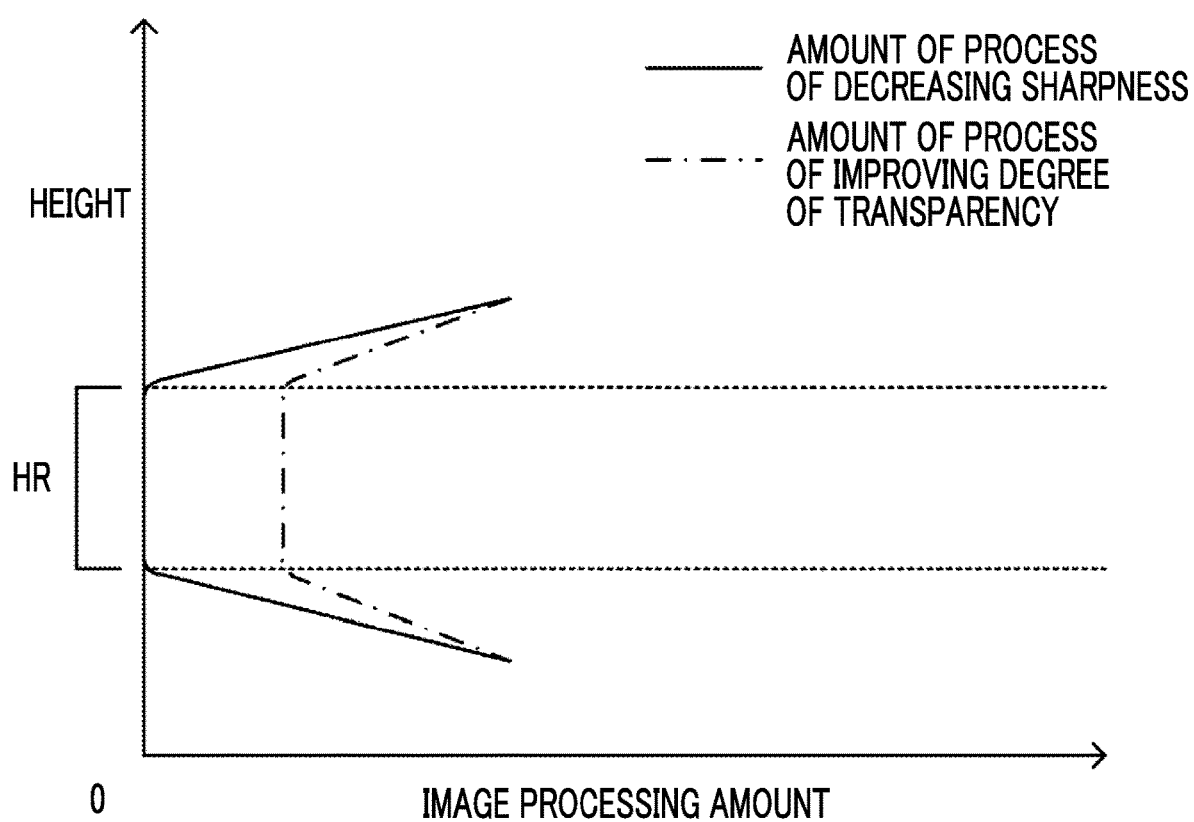
FIG. 11 is a diagram for describing a process of decreasing visibility of the icon for the contactless operation.

Hereinafter, an example of the process in this case will be described. FIG. 11 is a diagram for describing the process of decreasing the visibility of the icon ICN for the contactless operation. In the graph in FIG. 11, a vertical axis denotes the height H of the instruction object D from the operation surface 15b, and a horizontal axis denotes an image processing amount of the image processing for decreasing the sharpness of the icon ICN for the contactless operation. In addition, in the graph, a solid line illustrates an amount of the process of decreasing the sharpness, and a dot-dashed line illustrates an amount of the process of improving the degree of transparency.

The amount of the process of decreasing the sharpness is 0 in a case where the instruction object D is within the height range HR, and the image processing amount is increased as the instruction object D is separated from the height range HR. That is, in a case where the instruction object D is within the height range HR, the icon ICN for the contactless operation is completely not blurred. As the instruction object D is separated from the height range HR, the icon ICN for the contactless operation falls into a blurred state.

The amount of the process of improving the degree of transparency is not 0 and has a certain image processing amount even in a case where the instruction object D is within the height range HR, and the image processing amount is increased as the instruction object D is separated from the height range HR. That is, in a case where the instruction object D is within the height range HR, the icon ICN for the contactless operation is displayed in a semi-transparent state. As the instruction object D is separated from the height range HR, the icon ICN for the contactless operation falls into a more transparent state.

Figure 12:
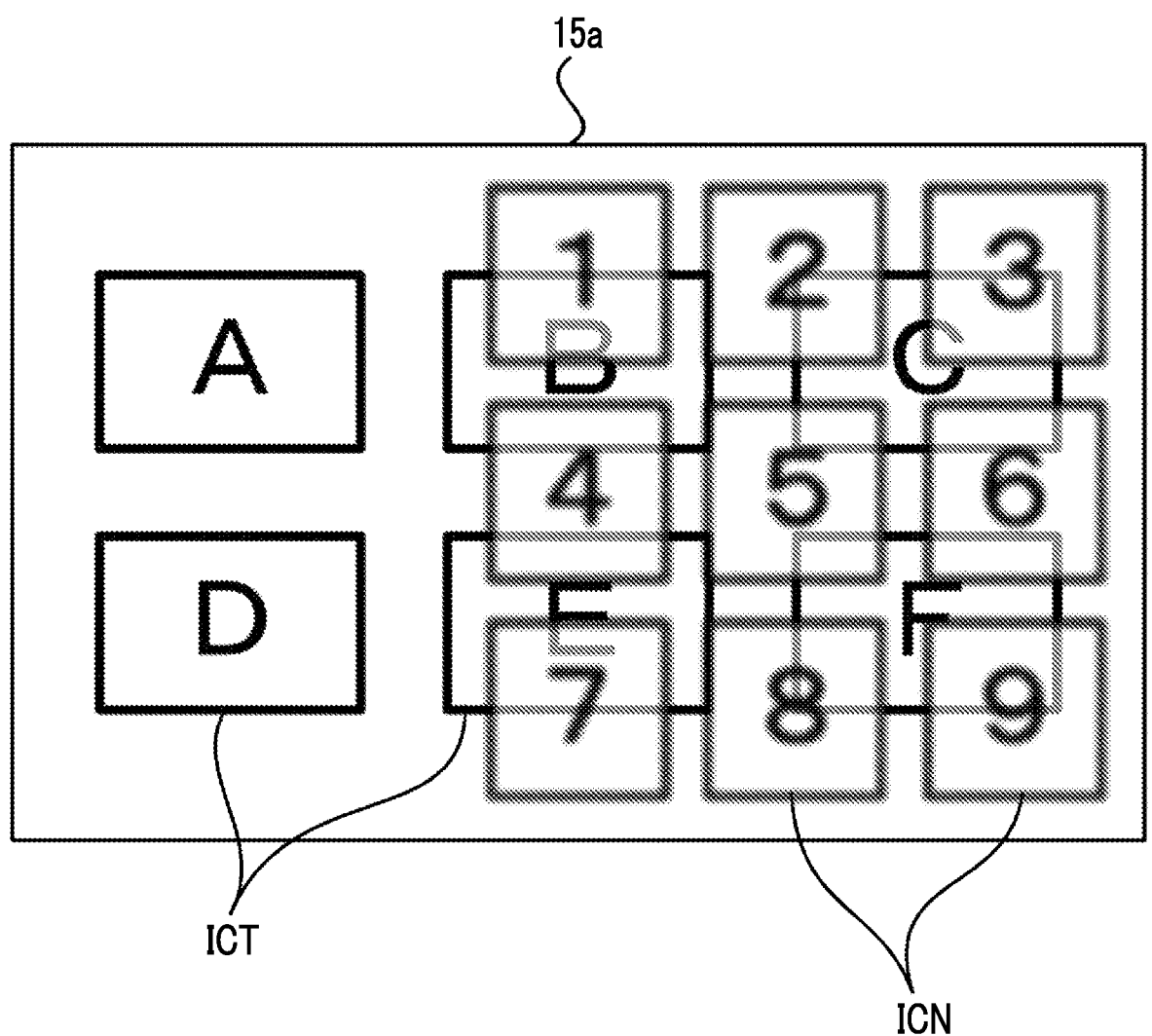
FIG. 12 is a diagram illustrating a display example of a state where the visibility of the icon for the contactless operation is decreased in displaying the icon for the contact operation and the icon for the contactless operation in a superimposed manner.

Thus, in a case where the instruction object D is within the height range HR, the icon ICN for the contactless operation is displayed in a semi-transparent and completely not blurred state as illustrated in FIG. 10. In addition, in a case where the instruction object D is separated from the height range HR, the icon ICN for the contactless operation is displayed in a blurred state with a higher degree of transparency than the state in FIG. 10 as illustrated in FIG. 12.

In addition, a plurality of the height range HR may be set in the height direction Z as a plurality of ranges not overlapping with each other, and the plurality of height ranges HR may correspond to different icons ICN for the contactless operation, respectively. The control unit 34 may display the icon ICN for the contactless operation corresponding to the height range closest from the instruction object among the plurality of height ranges HR on the display screen 15a.

Figure 13:
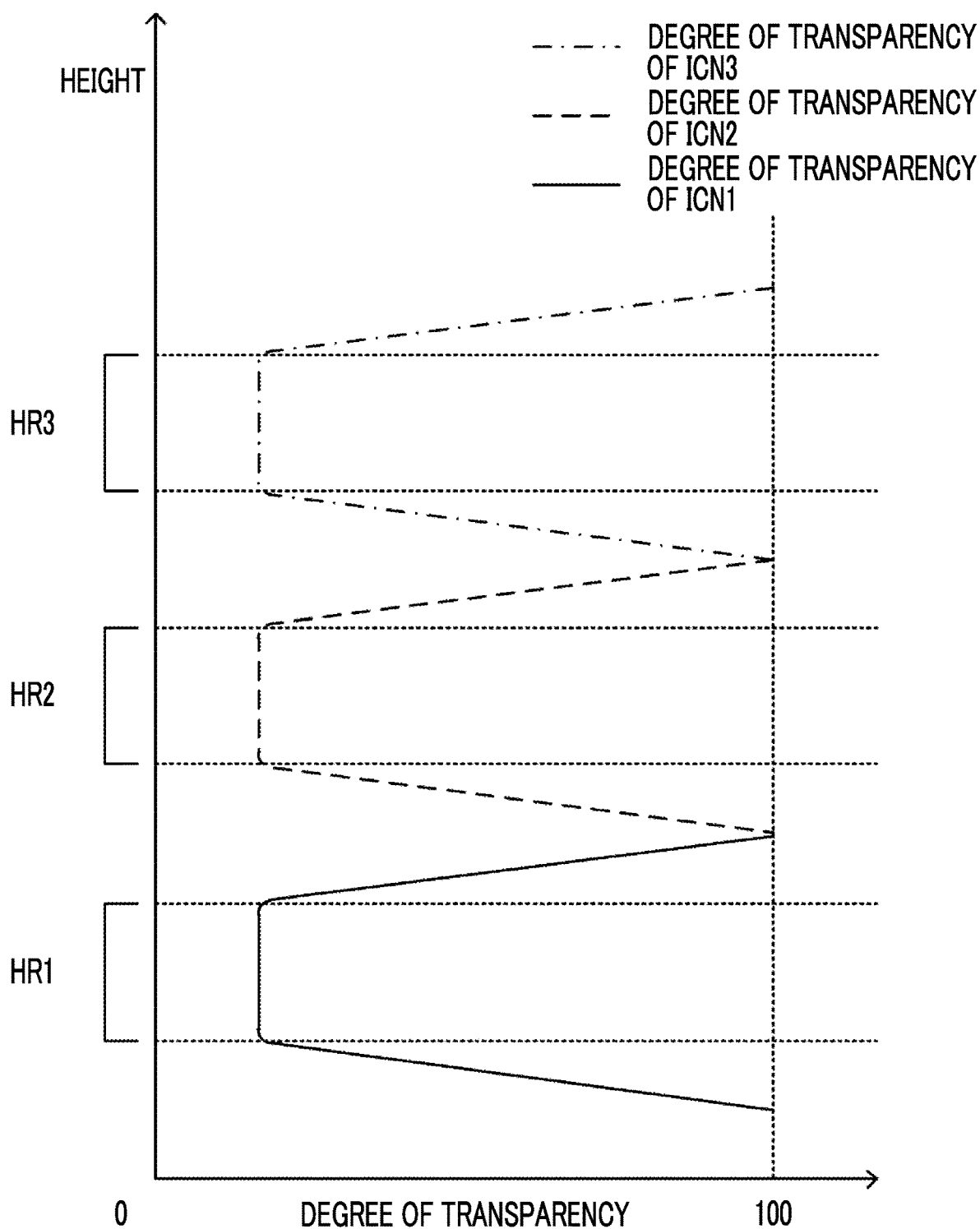
FIG. 13 is a diagram for describing a process of switching the displayed icon for the contactless operation in accordance with a height from an operation surface of an instruction object.

Hereinafter, an example of the process in this case will be described. FIG. 13 is a diagram for describing a process of switching the displayed icon ICN for the contactless operation in accordance with the height H from the operation surface 15b of the instruction object D.

In the graph in FIG. 13, a vertical axis denotes the height H of the instruction object D from the operation surface 15b, and a horizontal axis denotes the degree of transparency of the icon ICN for the contactless operation. In addition, in the graph, a solid line illustrates the degree of transparency of an icon ICN1 for the contactless operation, a dotted line illustrates the degree of transparency of an icon ICN2 for the contactless operation, and a dot-dashed line illustrates the degree of transparency of an icon ICN3 for the contactless operation. In a case where the degree of transparency of each icon is 100, the icon is in a completely non-displayed state.

For example, an assumption is made that three height ranges of a height range HR1 of greater than or equal to 2 cm and less than or equal to 4 cm, a height range HR2 of greater than or equal to 6 cm and less than or equal to 8 cm, and a height range HR3 of greater than or equal to 10 cm and less than or equal to 12 cm are set as a height range in which the contactless operation can be performed.

In addition, an assumption is made that the icon ICN1 for the contactless operation is set for the height range HR1, the icon ICN2 for the contactless operation is set for the height range HR2, and the icon ICN3 for the contactless operation is set for the height range HR3.

In addition, an assumption is made that 1 cm is set as the threshold value of the allowable range in which the display of the corresponding icon for the contactless operation is allowed in a case where the instruction object D is separated from the height range HR.

In this case, in a case where the height from the operation surface 15b to the instruction object D is within a range of greater than 1 cm and less than 5 cm, the control unit 34 displays the icon ICN1 for the contactless operation and the icon ICT for the contact operation in a superimposed manner on the display screen 15a.

In addition, in a case where the height from the operation surface 15b to the instruction object D is a height of 5 cm, the control unit 34 displays only the icon ICT for the contact operation on the display screen 15a.

In addition, in a case where the height from the operation surface 15b to the instruction object D is within a range of greater than 5 cm and less than 9 cm, the control unit 34 displays the icon ICN2 for the contactless operation and the icon ICT for the contact operation in a superimposed manner on the display screen 15a.

In addition, in a case where the height from the operation surface 15b to the instruction object D is a height of 9 cm, the control unit 34 displays only the icon ICT for the contact operation on the display screen 15a.

In addition, in a case where the height from the operation surface 15b to the instruction object D is within a range of greater than 9 cm and less than 13 cm, the control unit 34 displays the icon ICN3 for the contactless operation and the icon ICT for the contact operation in a superimposed manner on the display screen 15a.

In addition, in a case where a movement situation of the instruction object D satisfies a preset condition, the control unit 34 may not display the icon ICN for the contactless operation even in a situation of displaying the icon ICN for the contactless operation and the icon ICT for the contact operation in a superimposed manner on the display screen 15a.

In this case, for example, in a case where the instruction object D is approaching the operation surface 15b at a speed greater than or equal to a preset speed, the control unit 34 may not display the icon ICN for the contactless operation even in a situation of displaying the icon ICN for the contactless operation and the icon ICT for the contact operation in a superimposed manner on the display screen 15a.

Figure 14:
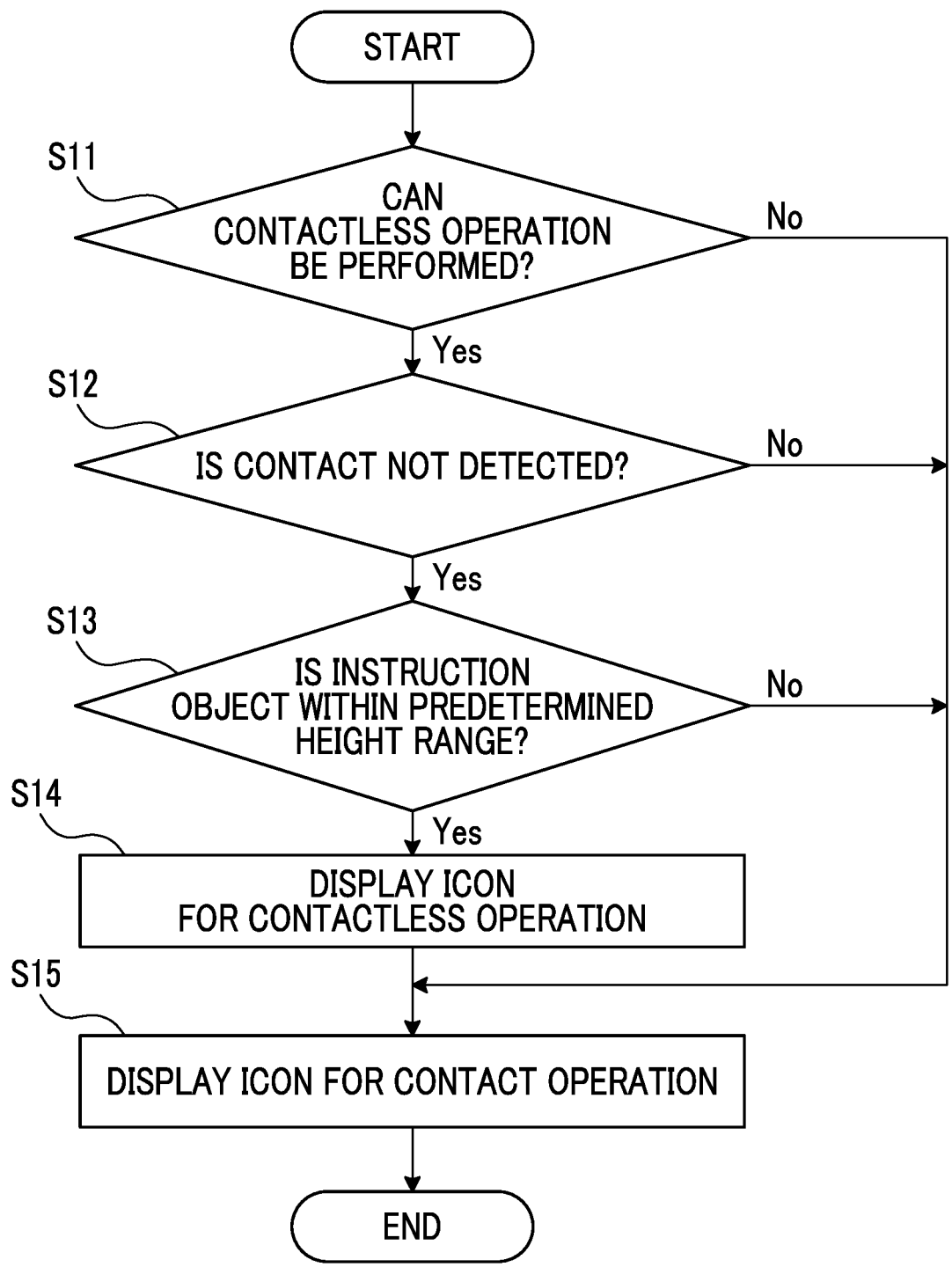
FIG. 14 is a flowchart for describing a flow of process in displaying the icon for operation in the image forming apparatus of the exemplary embodiment of the present disclosure.

Next, a flow of process in displaying the icon for operation in the image forming apparatus 10 of the present exemplary embodiment will be described with reference to the flowchart in FIG. 14.

In step S11, the control unit 34 determines whether or not the image forming apparatus 10 is in a state where the contactless operation can be performed.

In step S11, in a case where a determination is made that the image forming apparatus 10 is not in a state where the contactless operation can be performed, the control unit 34 displays only the icon ICT for the contact operation on the display screen 15a in step S15 and finishes the process.

In step S11, in a case where a determination is made that the image forming apparatus 10 is in a state where the contactless operation can be performed, the control unit 34 determines whether or not a contact of the instruction object D is not detected on the operation surface 15b of the touch panel 15 in step S12.

In step S12, in a case where a determination is made that the contact of the instruction object D is detected on the operation surface 15b, the control unit 34 displays only the icon ICT for the contact operation on the display screen 15a in step S15 and finishes the process.

In step S12, in a case where a determination is made that the contact of the instruction object D is not detected on the operation surface 15b, the control unit 34 determines whether or not the instruction object D is within a predetermined height range in step S13.

Here, the predetermined height range is a height range including the height range HR in which the contactless operation can be performed, and the allowable range in which the display of the icon ICN for the contactless operation is allowed in a case where the instruction object D is separated from the height range HR.

In step S13, in a case where a determination is made that the instruction object D is not within the predetermined height range, the control unit 34 displays only the icon ICT for the contact operation on the display screen 15a in step S15 and finishes the process.

In step S13, in a case where a determination is made that the instruction object D is within the predetermined height range, the control unit 34 displays the icon ICN for the contactless operation on the display screen 15a in step S14 and furthermore, displays the icon ICT for the contact operation on the display screen 15a in step S15.

That is, the control unit 34 displays the icon ICN for the contactless operation and the icon ICT for the contact operation in a superimposed manner on the display screen 15a and finishes the process.

Modification Example

While the image forming apparatus of the exemplary embodiment of the present disclosure has been described above, the present disclosure is not limited to the exemplary embodiment and can be appropriately changed.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

In addition, the information processing apparatus according to the exemplary embodiment of the present disclosure is not limited to the image forming apparatus and may be applied to other types of apparatuses.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
in displaying an operator on a display screen laminated with an operation surface in an image display device on which a contact operation of operating the operator displayed on the display screen in a state where an instruction object is in contact with the operation surface, and a contactless operation of operating the operator displayed on the display screen in a state where the instruction object is within a preset height range from the operation surface can be performed, acquire information about a height from the operation surface to the instruction object;
in a case where the instruction object is not in contact with the operation surface and a distance in which the instruction object is separated from the height range in a height direction is within a preset distance, display an operator for the contactless operation and an operator for the contact operation in a superimposed manner on the display screen; and
in a case where the instruction object is in contact with the operation surface, display only the operator for the contact operation on the display screen.

2. The information processing apparatus according to claim 1, wherein the processor is configured to:
in a case where the instruction object is separated by a preset distance or more from a position of the height range farthest from the operation surface in the height direction based on the operation surface, display only the operator for the contact operation on the display screen.

3. The information processing apparatus according to claim 2,
wherein a plurality of the height ranges are set in the height direction as a plurality of ranges not overlapping with each other,
the plurality of height ranges correspond to different operators for the contactless operation, respectively, and
the processor is configured to:
display an operator for the contactless operation corresponding to a height range closest from the instruction object among the plurality of height ranges on the display screen.

4. The information processing apparatus according to claim 3, wherein the processor is configured to:
in displaying the operator for the contactless operation and the operator for the contact operation in a superimposed manner on the display screen, superimpose the operator for the contactless operation on the operator for the contact operation.

5. The information processing apparatus according to claim 2, wherein the processor is configured to:
in displaying the operator for the contactless operation and the operator for the contact operation in a superimposed manner on the display screen, superimpose the operator for the contactless operation on the operator for the contact operation.

6. The information processing apparatus according to claim 1, wherein the processor is configured to:
in a case where the instruction object is separated by a preset distance or more from a position of the height range farthest from the operation surface in the height direction based on the operation surface, display the operator for the contactless operation and the operator for the contact operation in a superimposed manner on the display screen.

7. The information processing apparatus according to claim 6,
wherein a plurality of the height ranges are set in the height direction as a plurality of ranges not overlapping with each other,
the plurality of height ranges correspond to different operators for the contactless operation, respectively, and
the processor is configured to:
display an operator for the contactless operation corresponding to a height range closest from the instruction object among the plurality of height ranges on the display screen.

8. The information processing apparatus according to claim 7, wherein the processor is configured to:
in displaying the operator for the contactless operation and the operator for the contact operation in a superimposed manner on the display screen, superimpose the operator for the contactless operation on the operator for the contact operation.

9. The information processing apparatus according to claim 6, wherein the processor is configured to:
in displaying the operator for the contactless operation and the operator for the contact operation in a superimposed manner on the display screen, superimpose the operator for the contactless operation on the operator for the contact operation.

10. The information processing apparatus according to claim 1,
wherein a plurality of the height ranges are set in the height direction as a plurality of ranges not overlapping with each other,
the plurality of height ranges correspond to different operators for the contactless operation, respectively, and
the processor is configured to:
display an operator for the contactless operation corresponding to a height range closest from the instruction object among the plurality of height ranges on the display screen.

11. The information processing apparatus according to claim 10, wherein the processor is configured to:
in displaying the operator for the contactless operation and the operator for the contact operation in a superimposed manner on the display screen, superimpose the operator for the contactless operation on the operator for the contact operation.

12. The information processing apparatus according to claim 1, wherein the processor is configured to:
in displaying the operator for the contactless operation and the operator for the contact operation in a superimposed manner on the display screen, superimpose the operator for the contactless operation on the operator for the contact operation.

13. The information processing apparatus according to claim 12, wherein the processor is configured to:
in displaying the operator for the contactless operation and the operator for the contact operation in a superimposed manner on the display screen, display the operator for the contactless operation in a semi-transparent state.

14. The information processing apparatus according to claim 12, wherein the processor is configured to:
in displaying the operator for the contactless operation and the operator for the contact operation in a superimposed manner on the display screen, perform a process of decreasing visibility of the operator for the contactless operation corresponding to the height range as the instruction object is separated from the height range.

15. The information processing apparatus according to claim 14,
wherein the process of decreasing the visibility is a process of improving a degree of transparency.

16. The information processing apparatus according to claim 14,
wherein the process of decreasing the visibility is a process of decreasing sharpness.

17. The information processing apparatus according to claim 12, wherein the processor is configured to:
in a case where a movement situation of the instruction object satisfies a preset condition, not display the operator for the contactless operation even in a situation of displaying the operator for the contactless operation and the operator for the contact operation in a superimposed manner on the display screen.

18. The information processing apparatus according to claim 17, wherein the processor is configured to:
in a case where the instruction object is approaching the operation surface at a speed greater than or equal to a preset speed, not display the operator for the contactless operation even in a situation of displaying the operator for the contactless operation and the operator for the contact operation in a superimposed manner on the display screen.

19. A non-transitory computer readable medium storing a program causing a computer to execute a process comprising:
in displaying an operator on a display screen laminated with an operation surface in an image display device on which a contact operation of operating the operator displayed on the display screen in a state where an instruction object is in contact with the operation surface, and a contactless operation of operating the operator displayed on the display screen in a state where the instruction object is within a preset height range from the operation surface can be performed, acquiring information about a height from the operation surface to the instruction object;
displaying, in a case where the instruction object is not in contact with the operation surface and a distance in which the instruction object is separated from the height range in a height direction is within a preset distance, an operator for the contactless operation and an operator for the contact operation in a superimposed manner on the display screen; and displaying, in a case where the instruction object is in contact with the operation surface, only the operator for the contact operation on the display screen.

20. An information processing method comprising:

in displaying an operator on a display screen laminated with an operation surface in an image display device on which a contact operation of operating the operator displayed on the display screen in a state where an instruction object is in contact with the operation surface, and a contactless operation of operating the operator displayed on the display screen in a state where the instruction object is within a preset height range from the operation surface can be performed, acquiring information about a height from the operation surface to the instruction object;

displaying, in a case where the instruction object is not in contact with the operation surface and a distance in which the instruction object is separated from the height range in a height direction is within a preset distance, an operator for the contactless operation and an operator for the contact operation in a superimposed manner on the display screen; and displaying, in a case where the instruction object is in contact with the operation surface, only the operator for the contact operation on the display screen.

* * * * *